US012188299B2

(12) United States Patent
Brown et al.

(10) Patent No.: US 12,188,299 B2
(45) Date of Patent: Jan. 7, 2025

(54) EXPANDABLE WORK TRAY FOR A STEP STOOL OR LADDER

(71) Applicant: Dorel Home Furnishings, Inc., Wright City, MO (US)

(72) Inventors: Evan A. Brown, Campbellsburg, IN (US); Kyle J. Lawrence, Greenfield, IN (US)

(73) Assignee: Dorel Home Furnishings, Inc., Wright City, MO (US)

(*) Notice: Subject to any disclaimer, the term of this patent is extended or adjusted under 35 U.S.C. 154(b) by 857 days.

(21) Appl. No.: 17/313,719

(22) Filed: May 6, 2021

(65) Prior Publication Data

US 2021/0254406 A1    Aug. 19, 2021

Related U.S. Application Data

(63) Continuation-in-part of application No. 16/697,457, filed on Nov. 27, 2019, now Pat. No. 11,299,934.

(60) Provisional application No. 62/772,470, filed on Nov. 28, 2018.

(51) Int. Cl.
*E06C 7/14* (2006.01)
*E06C 1/20* (2006.01)
*E06C 1/393* (2006.01)

(52) U.S. Cl.
CPC .................. *E06C 7/14* (2013.01); *E06C 1/20* (2013.01); *E06C 1/393* (2013.01)

(58) Field of Classification Search
CPC ... E06C 1/20; E06C 1/39; E06C 1/393; E06C 7/14; B25H 3/023; B25H 3/025; B25H 3/026; B25H 3/027; B25H 3/06
See application file for complete search history.

(56) References Cited

U.S. PATENT DOCUMENTS

| | | | | | |
|---|---|---|---|---|---|
| 771,572 | A * | 10/1904 | Plummer | G09F 5/02 | 190/17 |
| 814,572 | A * | 3/1906 | Thilborger | G09F 5/02 | 190/17 |
| 1,118,326 | A * | 11/1914 | Braen | G09F 5/02 | 190/17 |
| 5,913,380 | A * | 6/1999 | Gugel | E06C 7/14 | 248/210 |
| 8,186,481 | B2 * | 5/2012 | Moss | E06C 7/16 | 182/25 |
| 8,770,778 | B2 * | 7/2014 | Pereira | E06C 7/14 | 362/127 |
| 9,089,965 | B1 * | 7/2015 | Cheng | B65D 43/16 | |
| 9,770,822 | B2 * | 9/2017 | Sabbag | B25H 3/028 | |
| 10,138,680 | B2 * | 11/2018 | Williams | E06C 7/14 | |
| 11,299,934 | B2 * | 4/2022 | Brown | E06C 1/393 | |
| 11,536,088 | B2 * | 12/2022 | Leng | E06C 7/14 | |
| 2007/0159040 | A1 * | 7/2007 | Fernandez | B25H 3/023 | 312/348.3 |

* cited by examiner

*Primary Examiner* — Colleen M Chavchavadze

(74) *Attorney, Agent, or Firm* — Barnes & Thornburg LLP

(57) ABSTRACT

A step stool includes an expandable tray assembly. The expandable tray assembly has a fixed tray panel and a movable tray panel coupled to the fixed tray unit for movement relative to the fixed tray unit. The movable tray panel is illustratively movable between a collapsed position, arranged above the fixed tray panel, and an expanded position, arranged adjacent to the fixed tray panel.

20 Claims, 7 Drawing Sheets

EXPANDABLE WORK TRAY FOR A STEP STOOL OR LADDER

PRIORITY CLAIM

This application is a continuation-in-part of U.S. application Ser. No. 16/697,457, filed Nov. 27, 2019, which claims priority under 35 U.S.C. § 119(e) to U.S. Provisional Application Ser. No. 62/772,470, filed Nov. 28, 2018, each of which is expressly incorporated by reference herein.

BACKGROUND

The present invention relates to a step stool, and particularly to a folding step stool including legs that fold between an opened use position and a folded storage position. More particularly, the present invention relates to a tray assembly used for storing or holding articles associated with the use of the step stool.

Step stools have a frame and one or more steps that individuals use for elevation when reaching for objects, painting walls, or any everyday task where extra elevation would be helpful. Step stool frames are often foldable for ease of storage while the step stool is not being used. Additionally, a tray assembly may be included to facilitate holding items.

SUMMARY

According to the disclosure, a step stool includes a frame having legs movable relative to each other between an opened use position and a folded storage position. The step stool frame includes an upper portion and a lower portion. At least one step is coupled to the lower portion. An expandable tray assembly is provided having a fixed tray unit mounted to the upper portion and a movable tray panel coupled to the fixed tray unit for movement relative to the fixed tray unit. The movable tray panel is illustratively movable between a collapsed position, arranged above the fixed tray unit, and an expanded position, arranged adjacent to the fixed tray unit.

In illustrative embodiments, the expandable tray assembly includes a tray-motion controller linkage that guides movement of the movable tray panel between the collapsed position and the expanded position. The tray-motion controller linkage is configured to guide the movable tray panel during motion from the collapsed position to the expanded position so as to maintain a top surface of the movable tray panel in an upwardly-facing orientation so that objects supported in compartments of the movable tray panel can remain in place during transition from the collapsed position to the expanded position.

Additional features of the invention will become apparent to those skilled in the art upon consideration of the following detailed description of preferred embodiments exemplifying the best mode of carrying out the invention as presently perceived.

BRIEF DESCRIPTIONS OF THE DRAWINGS

FIG. 1 is a perspective view of a step stool including a foldable step stool frame and an expandable tray assembly that provides a relatively-small or a relatively-large support area for a user on the step stool frame in accordance with a first embodiment of the present disclosure showing that the expandable tray assembly is coupled to an upper portion of the step stool frame;

FIG. 2 is a perspective view of the upper portion of the step stool frame and the expandable tray assembly of FIG. 1 showing that the expandable tray assembly includes a fixed tray unit with a fixed tray panel, a movable tray panel coupled to the fixed tray panel for motion relative to the fixed tray panel, and a tray-motion controller linkage including forward links and rear links that control movement of the movable tray panel from a collapsed position, shown in FIG. 3, to an expanded position, shown in FIG. 4, in such a way so as to maintain a top surface of the movable try panel in an upwardly-facing orientation so that objects supported in compartments of the movable tray panel can remain in place during transition from the collapsed position to the expanded position;

FIG. 3 is a side elevation view of the step stool of FIG. 1 showing the movable tray panel in the collapsed position resting on top of the fixed tray and positioned in an upwardly-facing orientation such that a bottom surface of the movable tray panel abuts a top surface of the fixed tray panel, a forwardly-facing surface of the fixed tray panel is aligned with a forwardly-facing surface of the movable tray panel along a forward plane, and rearwardly-facing surface of the fixed tray panel is aligned with a rearwardly-facing surface of the movable tray panel along an intermediate plane parallel with the forward plane;

FIG. 4 is a side elevation view of the expandable tray assembly similar to that shown in FIG. 3, except that the movable tray panel has been moved from the collapsed position to the expanded position while still being positioned in the upwardly facing orientation with the movable tray panel adjacent to the fixed tray panel showing that a top surface of the movable tray panel is coplanar with the top surface of the fixed tray panel, the bottom surface of the movable tray panel is coplanar with a bottom surface of the fixed tray panel, the forwardly-facing surface of the fixed tray panel is positioned along the forward plane, the rearwardly-facing surface of the movable tray panel is positioned along a rearward plane parallel to the forward plane, and the rearwardly-facing surface of the fixed tray panel and the forwardly-facing surface of the movable tray panel are positioned along the intermediate plane in abutting relationship with one another to allow the fixed tray panel to provide cantilevering support to the movable tray panel when the expandable tray assembly is in the expanded position;

FIG. 5 is a perspective view of a step stool including an expandable tray assembly in accordance with a second embodiment of the present disclosure showing the expandable tray assembly includes a fixed tray panel, a movable tray panel coupled to the fixed tray panel for motion relative to the fixed tray panel, and a tray-motion controller linkage including a single link on either side of the expandable tray assembly and a middle link coupled at a middle of the expandable tray assembly that control movement of the movable tray panel from a collapsed position, shown in FIG. 7, to an expanded position, shown in FIG. 8, in such a way so as to maintain a top surface of the movable try panel in an upwardly-facing orientation so that objects supported in compartments of the movable tray panel can remain in place during transition from the collapsed position to the expanded position;

FIG. 6 is an exploded view of the step stool of FIG. 5 showing the tray-motion controller linkage further includes bias members configured to engage the fixed tray panel and the middle link to bias the middle link from a first orientation, shown in FIG. 9, to a second orientation, shown in FIG. 10, to cause the movable tray panel to move toward the expanded position;

FIG. 7 is side elevation view of the step stool of FIG. 5 showing the movable tray panel in the collapsed position resting on top of the fixed tray and positioned in an upwardly-facing orientation such that a bottom surface of the movable tray panel abuts a top surface of the fixed tray panel, and further showing the expandable tray assembly further includes a tray lock having a moveable tray portion coupled to the moveable tray panel and a fixed tray portion coupled to the fixed tray panel that cooperate to block movement of the moveable tray panel relative to the fixed tray panel;

Figure 5:
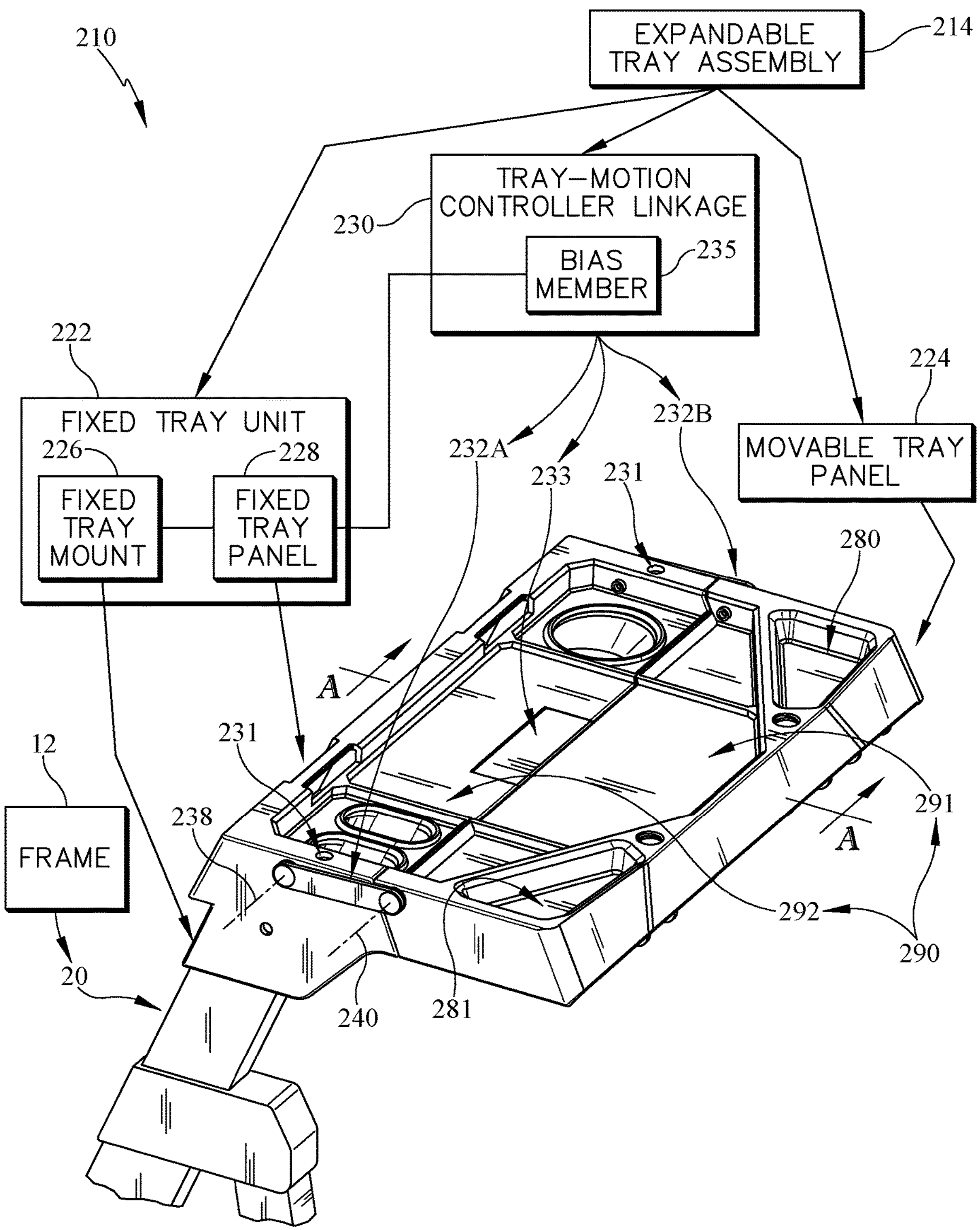
Figure 9:
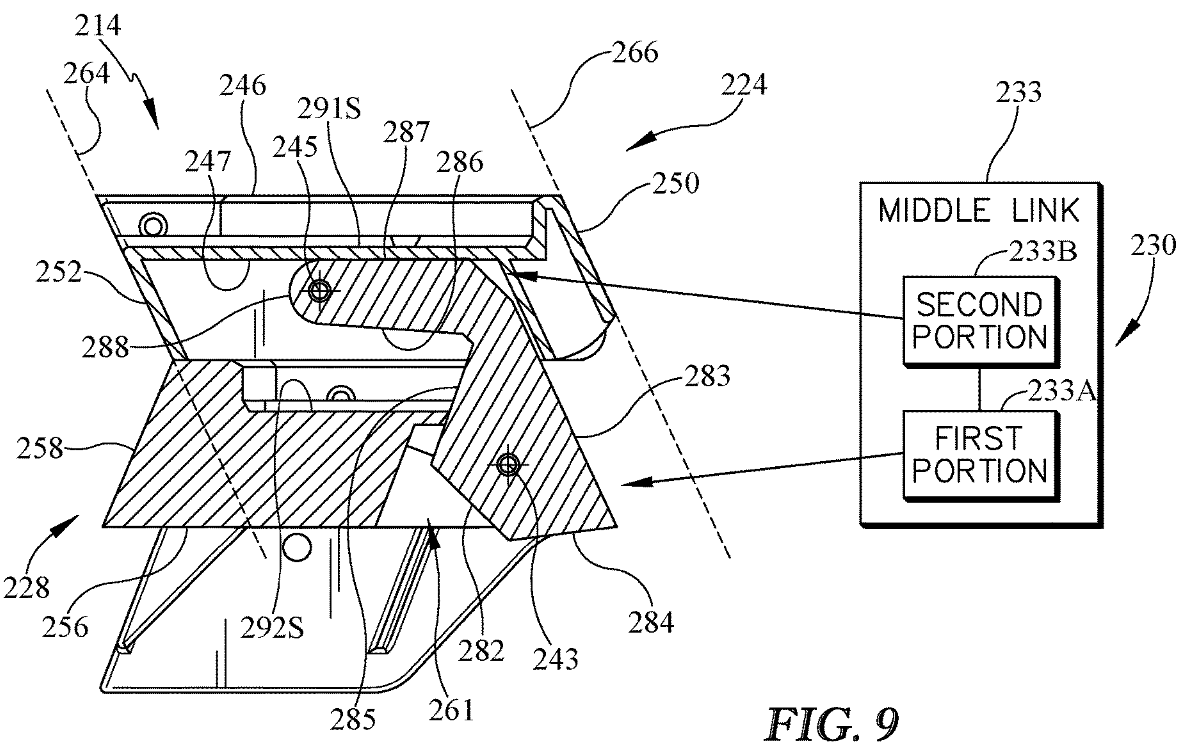
FIG. 9 is a cross-section diagrammatic view of the expandable tray assembly included in the step stool of FIG. 5 taken along line A-A showing the movable tray panel in the collapsed position such that the middle link of the tray-motion controller linkage in the first orientation.
Figure 10:
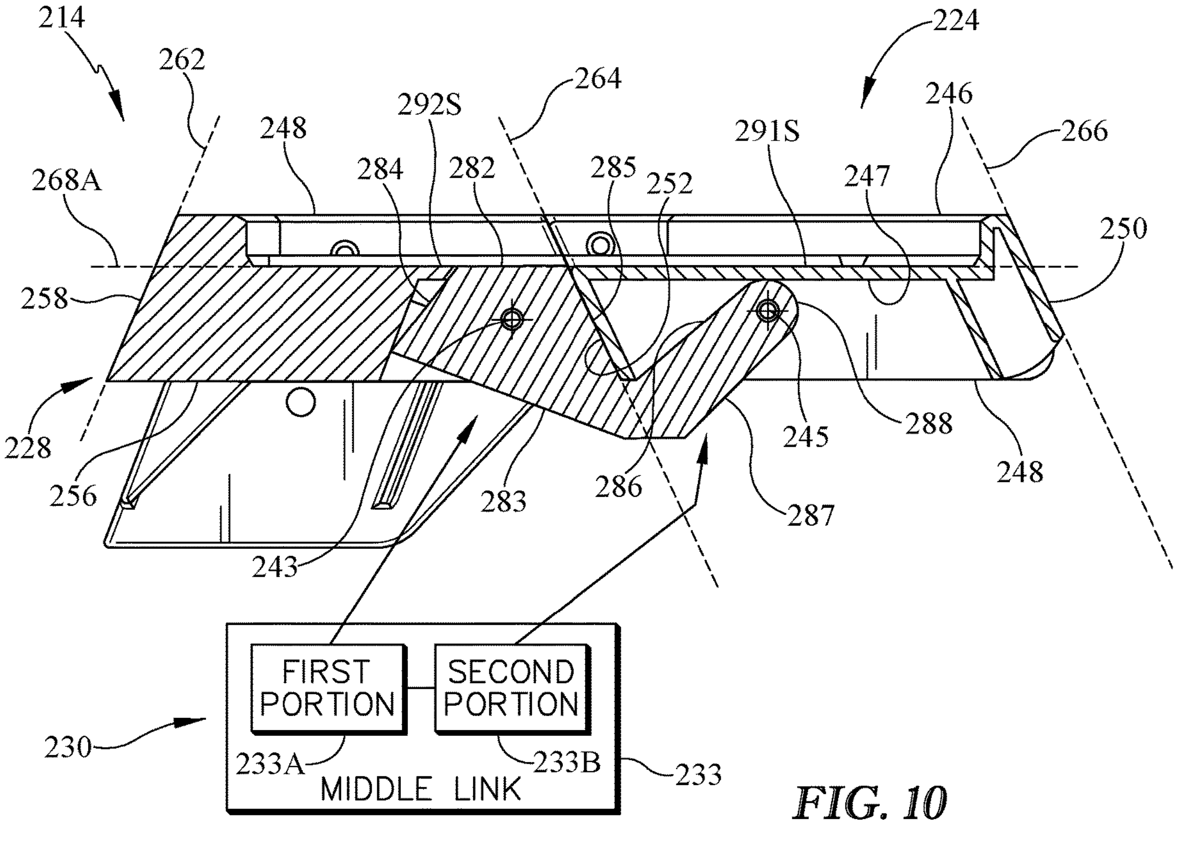
Figure 11:
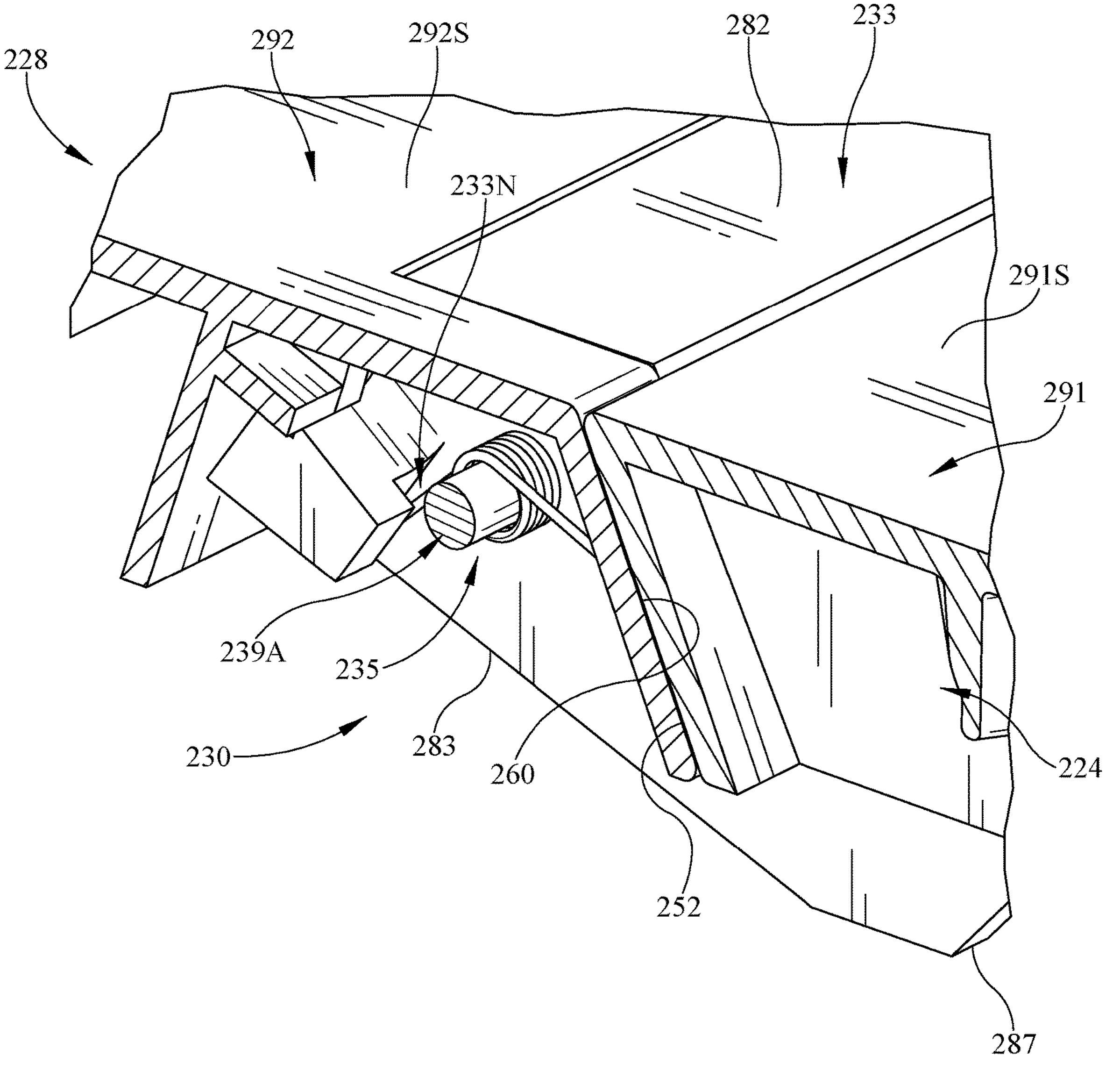

FIG. 10 is a cross-section diagrammatic view of the expandable tray assembly similar to that shown in FIG. 9, except that the movable tray panel has been moved from the collapsed position to the expanded position showing the middle link of the tray-motion controller linkage has moved to the second orientation to support the movable tray panel; and FIG. 11 is cross-section view of the expandable tray assembly included in the step stool of FIG. 5 showing one of the bias members is arranged to extend into a notch formed on the middle link to maintain engagement with the middle link.

DETAILED DESCRIPTION

Figure 1:
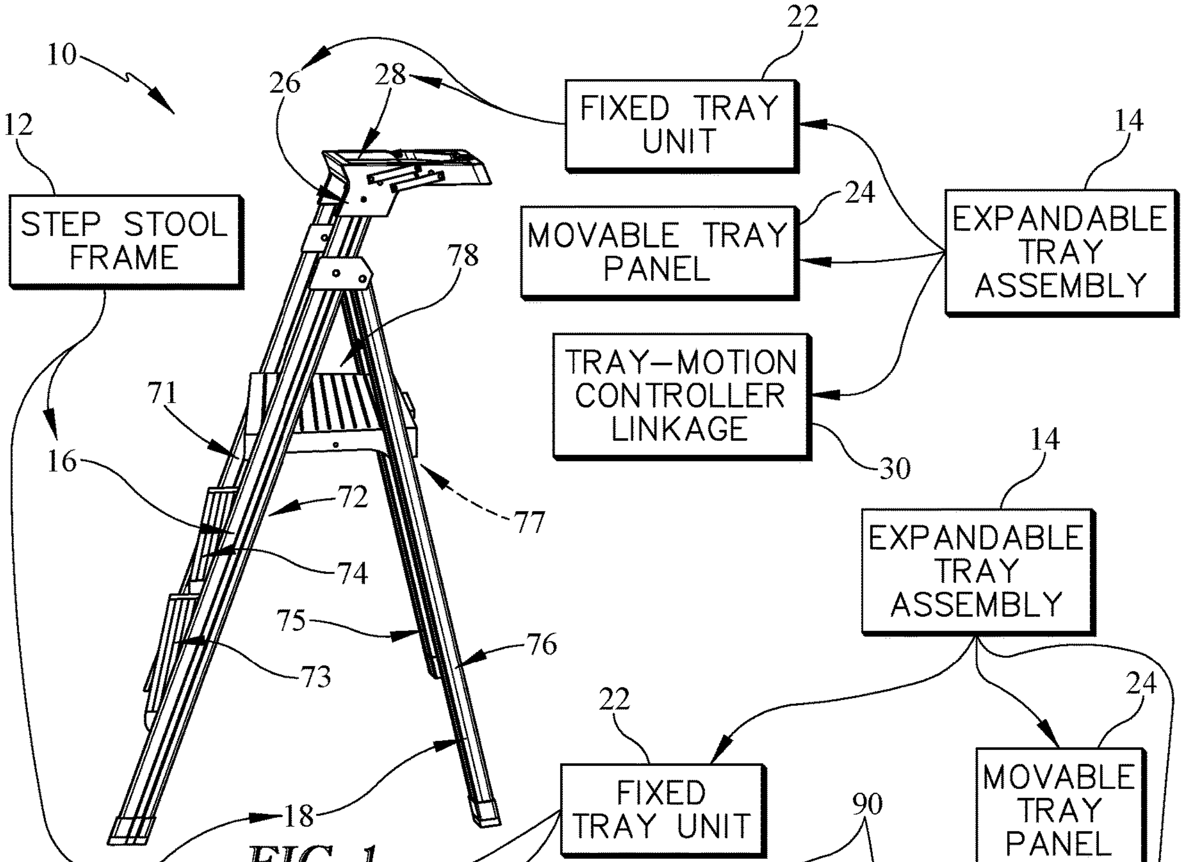
Figure 2:
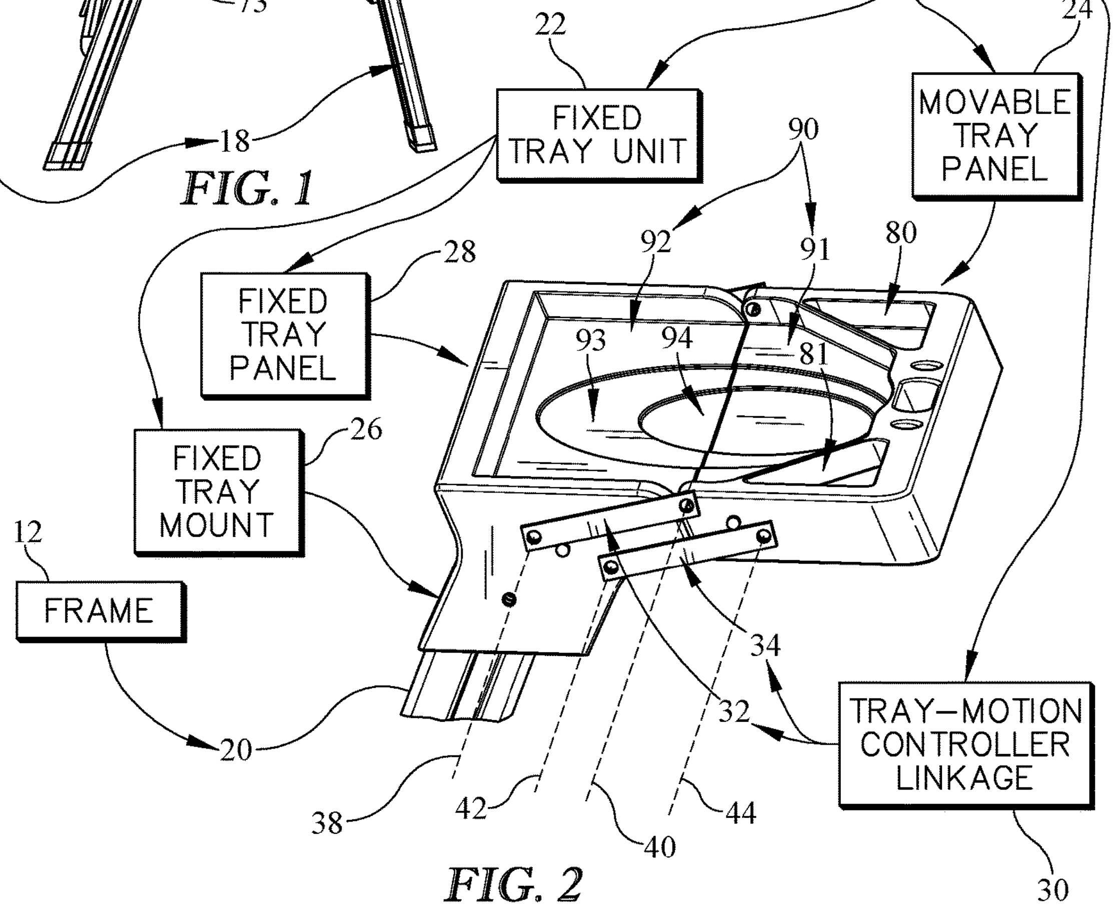
Figure 6:
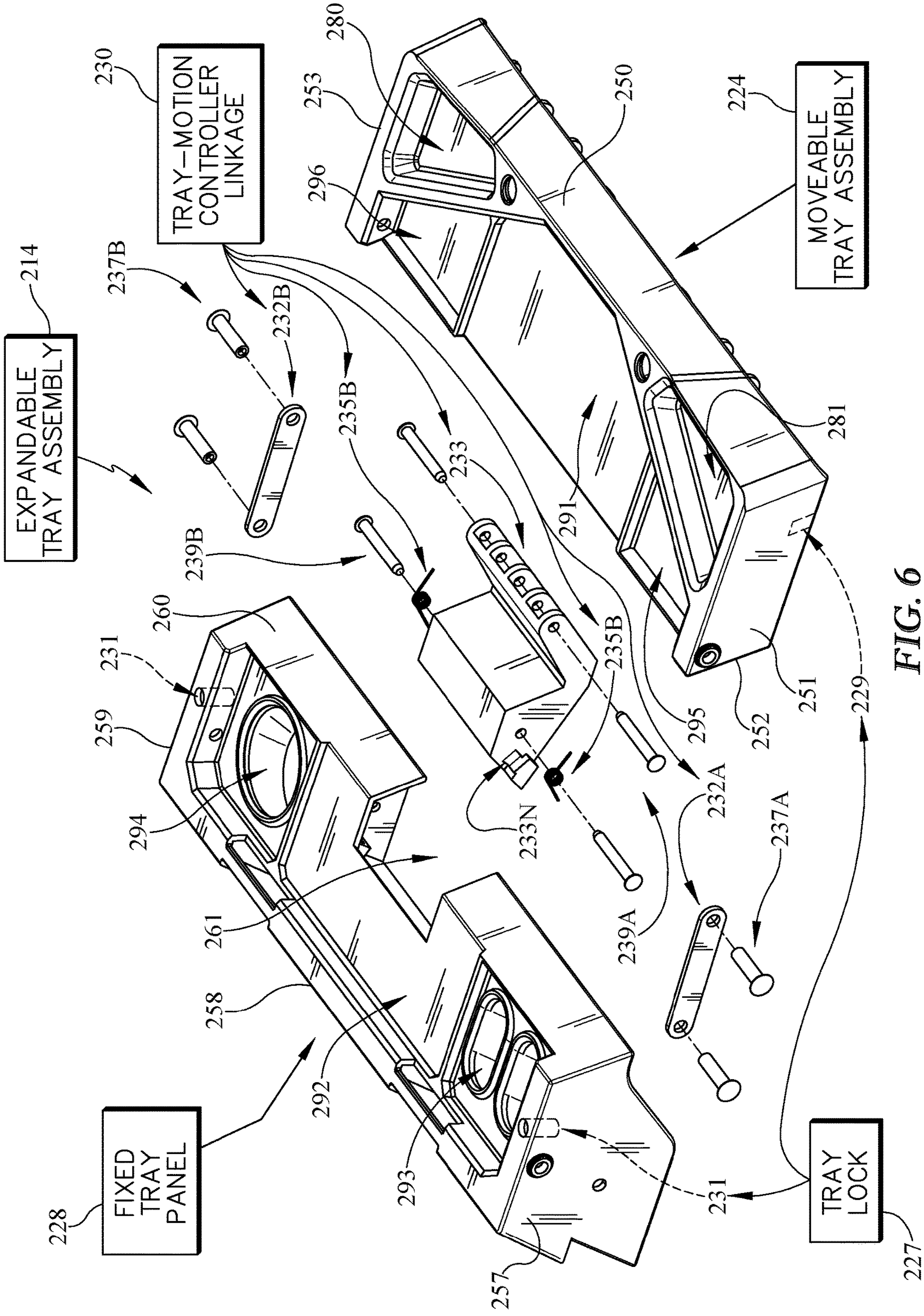
Figure 7:
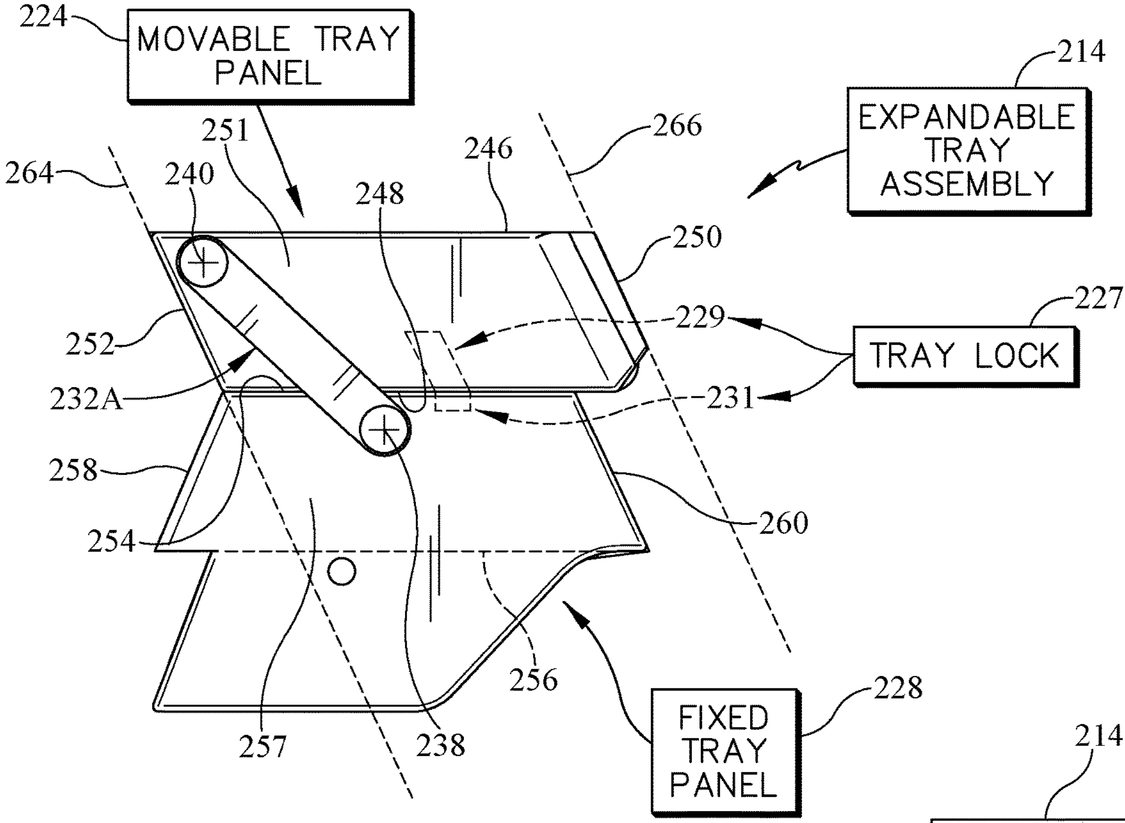

A first embodiment of a step stool 10 is shown in FIGS. 1-4. The step stool 10 includes a step stool frame 12 and an expandable tray assembly 14 coupled to the step stool frame 12, as shown in FIGS. 1 and 2. The step stool frame 12 includes a front leg unit 16 and a rear leg unit 18 pivotably coupled to the front leg unit 16 for movement from a closed storage position to an opened use position, as suggested in FIG. 1. The expandable tray assembly 14 is coupled to an upper portion 20 of the step stool frame 12 and is reconfigurable between an expanded configuration shown in FIGS. 1, 2, and 4 and a collapsed configuration shown in FIG. 3. A second embodiment of an expandable tray assembly 214 included in a step stool 210 is shown in FIGS. 5-7.

The expandable tray assembly 14 includes a fixed tray unit 22 and a movable tray panel 24 movable relative to the fixed tray unit 22, as shown in FIG. 2. The fixed tray unit 22 includes a fixed tray mount 26 coupled to the upper portion 20 of the step stool frame 12 and a fixed tray panel 28 coupled to the movable tray panel 24 and the fixed tray mount 26. The movable tray panel 24 is movable relative to the fixed tray panel 28 to establish a collapsed position when the expandable tray assembly 14 is in the collapsed configuration and an expanded position when the expandable tray assembly 14 is in the expanded configuration. The expandable tray assembly 14 further includes a tray-motion controller linkage 30 configured to control movement of the movable tray panel 24 between the collapsed position and the expanded position, as shown in FIGS. 1-4.

The tray-motion controller linkage 30 includes forward links 32 and rear links 34 each pivotably coupled to the fixed tray panel 28 and the movable tray panel 24. The forward links 32 and rears links 34 guide motion of the movable tray panel 24 in such a way so as to maintain a top surface 46 of the movable tray panel 24 in an upwardly-facing orientation so that objects supported in compartments 80, 82 formed in the top surface 46 of the movable tray panel 24 can remain in place while the expandable tray assembly 14 transitions from the collapsed position to the expanded position, as suggested in FIG. 2.

The forward links 32 of the tray-motion controller linkage 30 are pivotably coupled to the fixed tray panel 28 for rotation about the first-fixed-tray-panel axis 38 and pivotably coupled to the movable tray panel 24 for rotation about the first-movable-tray-panel axis 40, as shown in FIG. 2. The rear links 34 are pivotably coupled to the fixed tray panel 28 for rotation about the second-fixed-tray-panel axis 42 and pivotably coupled to the movable tray panel 24 for rotation about the second-movable-tray-panel axis 44. In the illustrative embodiment, the tray-motion controller linkage 30 has forward and rear links 32, 34 coupled to each side of the panels 24, 28.

Figure 3:
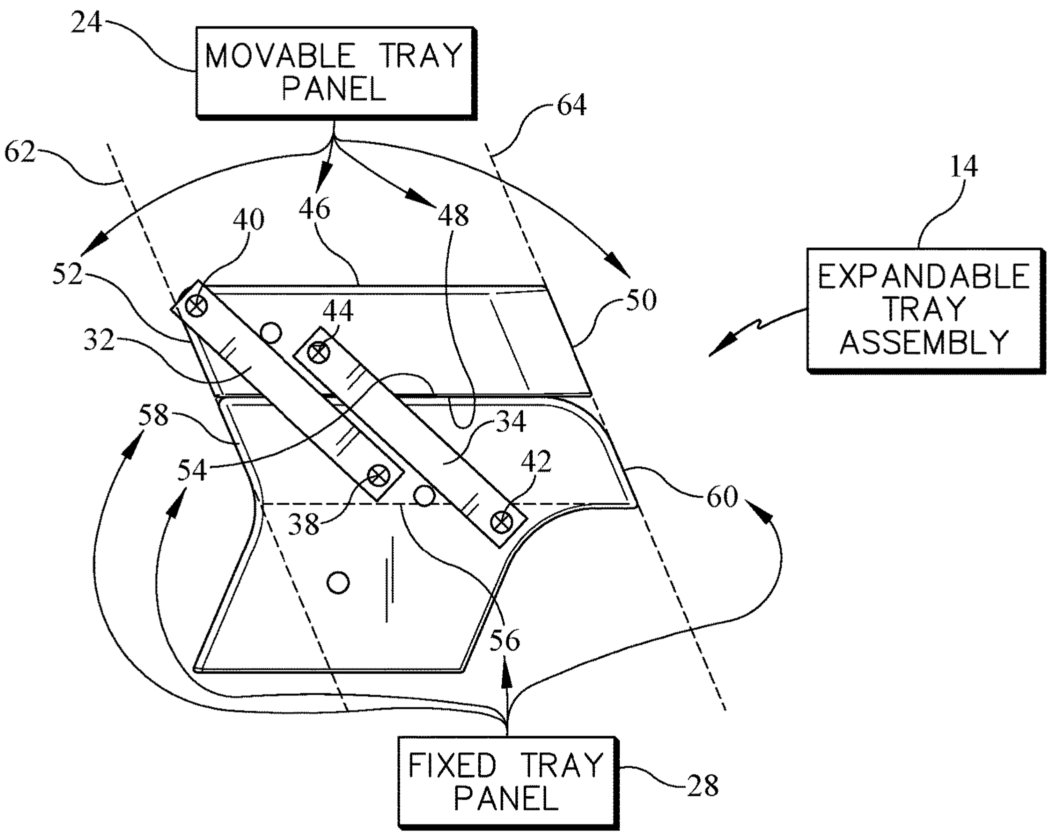
Figure 4:
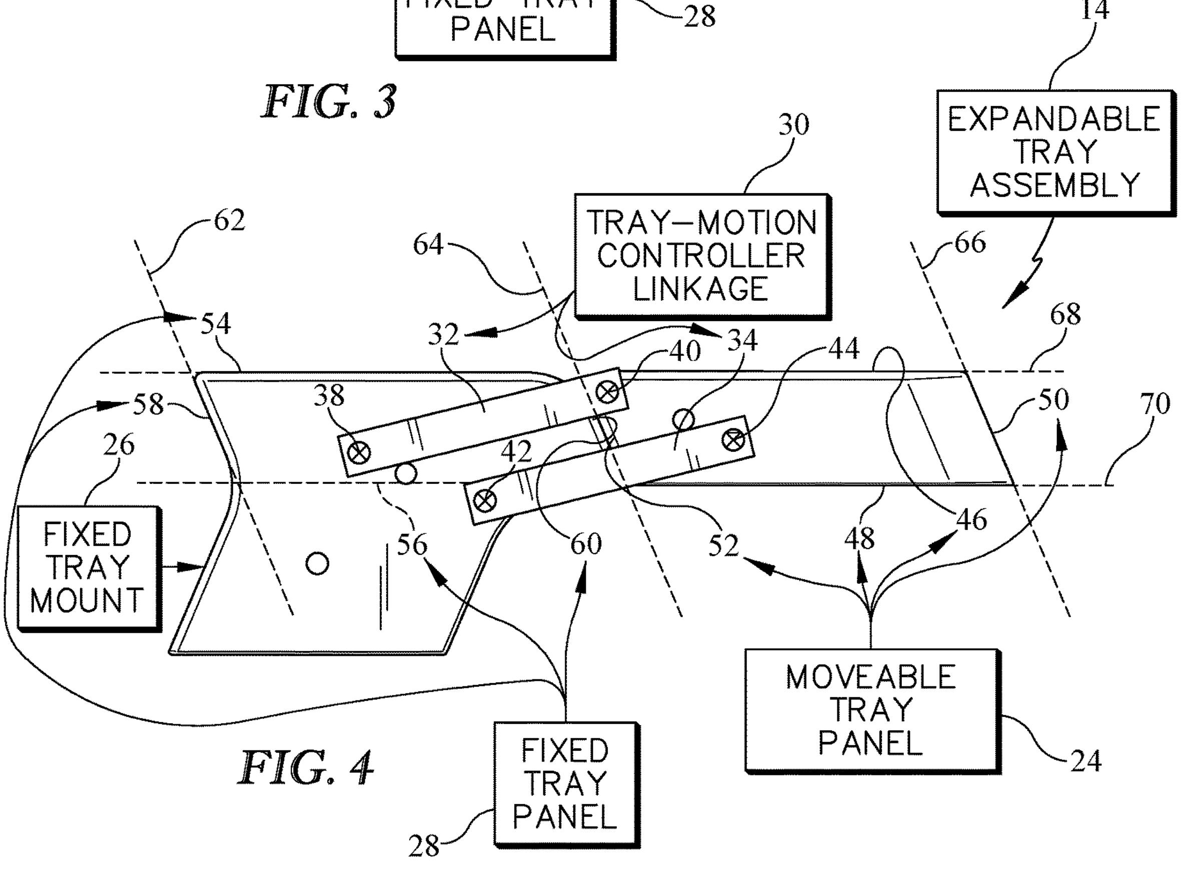

The movable tray panel 24 includes the upwardly-facing top surface 46, a bottom surface 48 opposite the top surface 46, a rearwardly-facing surface 50 extending between the top surface 46 and the bottom surface 48, and a forwardly-facing surface 52 positioned opposite the rearwardly-facing surface 50 and extending between the top surface 46 and the bottom surface 48, as shown in FIGS. 3 and 4. The movable tray panel 24 rests on top of the fixed tray panel 28 in the upwardly-facing orientation when the expandable tray assembly 14 is in the collapsed configuration shown in FIG. 3. The movable tray panel 24 is supported adjacent to the fixed tray panel 28 in the upwardly-facing orientation when the expandable tray assembly 14 is in the expanded configuration shown in FIG. 4.

The fixed tray panel 28 includes an upwardly-facing top surface 54, a bottom surface 56 opposite the top surface 54, a rearwardly-facing surface 60 extending between the top surface 54 and the bottom surface 56, and a forwardly-facing surface 58 positioned opposite the rearwardly-facing surface 60 and extending between the top surface 54 and the bottom surface 56, as shown in FIGS. 3 and 4. When the expandable tray assembly 14 is in the collapsed configuration, as shown in FIG. 3, the movable tray panel 224 is in the collapsed position such that the bottom surface 48 of the movable tray panel 24 abuts and engages the top surface 54 of the fixed tray panel 28.

When the expandable tray assembly 14 is in the collapsed configuration, as shown in FIG. 3, the forwardly-facing surface 58 of the fixed tray panel 28 is aligned with the forwardly-facing surface 52 of the movable tray panel 24 along a forward plane 62. When the expandable tray assembly 14 is in the collapsed configuration, as shown in FIG. 3, the rearwardly-facing surface 60 of the fixed tray panel 28 is aligned with the rearwardly-facing surface 50 of the movable tray panel 24 along an intermediate plane 64. The intermediate plane 64 is parallel to the forward plane 62.

As discussed above, the tray-motion controller linkage 30 is configured to control movement of the movable tray panel 24 as the expandable tray assembly 14 moves between the collapsed configuration shown in FIG. 3 and the expanded configuration shown in FIG. 4. As the expandable tray assembly 14 moves between the collapsed configuration and the expanded configuration, the movable tray panel 24 remains in the upwardly facing orientation, as suggested by FIGS. 3 and 4.

When the expandable tray assembly 14 is in the expanded configuration, the movable tray panel 24 is adjacent to the fixed tray panel 28, as shown in FIG. 4. When the expandable tray assembly 14 is in the expanded configuration, the top surface 46 of the movable tray panel 24 is aligned with the top surface 54 of the fixed tray panel 28 along an intermediate-transverse plane 68, and the bottom surface 48 of the movable tray panel 24 is aligned with the bottom surface 56 of the fixed tray panel 28 along a bottom-transverse plane 70 parallel to the intermediate-transverse plane 68.

When the expandable tray assembly 14 is in the expanded configuration, the forwardly-facing surface 58 of the fixed tray panel 28 is positioned along the forward plane 62, the rearwardly-facing surface 50 of the movable tray panel 24 is positioned along a rearward plane 66 parallel to the forward plane 62 and the intermediate plane 64, and the rearwardly-facing surface 60 of the fixed tray panel 28 and the forwardly-facing surface 52 of the movable tray panel 24 are positioned along the intermediate plane 64, as shown in FIG. 4. The rearwardly-facing surface 60 of the fixed tray panel 28 and the forwardly-facing surface 52 of the movable tray panel 24 are positioned in confronting, abutting relationship with one another to allow the fixed tray panel 28 to support to the movable tray panel 24 when the expandable tray assembly 14 is in the expanded configuration.

In the illustrated embodiment, the movable tray panel 24 is shaped to define a recess 91 and the fixed tray panel 28 is formed to define a recess 92 as shown in FIG. 2. The recesses 91, 92 cooperate when the movable tray panel 24 is in the expanded use position to provide a compartment 90 surrounded on all sides by walls to retain items stored/placed therein. In particular, the compartment 90 is sized to receive paint cans and is further formed to include indentations 93, 94 sized to receive standard paint cans so as to discourage unwanted sliding of the paint cans when placed in the indentations 93, 94.

The front leg unit 16 illustratively includes legs 71, 72, and steps 73, 74 as shown in FIG. 1. The steps 73, 74 extend between the legs 71, 72 and provide footrests for a user climbing the step stool 10.

The rear leg unit 18 illustratively includes legs 75, 76 and a cross-member 77 as shown in FIG. 1. The cross-member 77 extends between the legs 75, 76. In the illustrated embodiment, a panel 78 is coupled to the legs 71, 72 of the front leg unit and selectively engages the cross-member 77 of the rear leg unit 18 to lock the step stool frame 12 in the opened use position as suggested in FIG. 1.

An expandable tray assembly 214 in accordance with a second embodiment of the present disclosure is coupled to the step stool frame 12 to provide a step stool 210, as shown in FIG. 5. The expandable tray assembly 214 is coupled to the upper portion 20 of the step stool frame 12 and is reconfigurable between an expanded configuration shown in FIGS. 7 and 9 and a collapsed configuration shown in FIGS. 8 and 10.

The expandable tray assembly 214 includes a fixed tray unit 222, a movable tray panel 224 movable relative to the fixed tray unit 222, and a tray-motion controller linkage 230, as shown in FIG. 6. The fixed tray unit 222 includes a fixed tray mount 226 coupled to the upper portion 20 of the step stool frame 12 and a fixed tray panel 228 coupled to the movable tray panel 224 and the fixed tray mount 226. The movable tray panel 224 is movable relative to the fixed tray panel 228 to establish a collapsed position when the expandable tray assembly 214 is in the collapsed configuration and an expanded position when the expandable tray assembly 214 is in the expanded configuration. The tray-motion controller linkage 230 is configured to control movement of the movable tray panel 224 between the collapsed position and the expanded position, as shown in FIGS. 7-10.

The tray-motion controller linkage 230 includes side links 232A, 232B and a middle link 233 that are each pivotably coupled to the fixed tray panel 228 and the movable tray panel 224, as shown in FIGS. 5-7. The side links 232A, 232B and the middle link 233 guide motion of the movable tray panel 224 in such a way so as to maintain a top surface 246 of the movable tray panel 224 in an upwardly-facing orientation so that objects supported in compartments 280, 281 formed in the top surface 246 of the movable tray panel 224 can remain in place while the expandable tray assembly 214 transitions from the collapsed position to the expanded position, as suggested in FIG. 2.

The side links 232A, 232B of the tray-motion controller linkage 230 are arranged on either side of the panels 224, 228. Each of the side links 232A, 232B are pivotably coupled to the fixed tray panel 228 for rotation about the first-fixed-tray-panel axis 238 and pivotably coupled to the movable tray panel 224 for rotation about the first-movable-tray-panel axis 240, as shown in FIG. 5-7. The middle link 233 is pivotably coupled to the fixed tray panel 228 for rotation about the second-fixed-tray-panel axis 243 and pivotably coupled to the movable tray panel 224 for rotation about the second-movable-tray-panel axis 245.

The tray-motion controller linkage 230 further includes at least one bias member 235 arranged to extend between the middle link 233 and the fixed tray panel 228, as suggested in FIG. 5. The bias member 235 is configured to bias the middle link 233 from a first orientation in which the expandable tray assembly 214 is in the collapsed configuration as shown in FIG. 9 to a second orientation in which the expandable tray assembly 214 is in the expanded configuration as shown in FIG. 10. In other words, the bias member 235 biases the middle link 233 to move the movable tray panel 224 toward the expanded position. In the illustrative embodiment, the tray-motion controller linkage 230 includes at least two bias members 235A, 235B arranged on opposite sides of the middle link 233 as shown in FIG. 6.

In the illustrative embodiment, the middle link 233 is shaped to include a notch 233N as shown in FIGS. 6 and 11. A first end of the bias member 235 extends into the notch 233N to engage the middle link 233, while the other end engages the fixed tray panel 228. The bias member 235 engages the middle link 233 in the notch to bias the middle link 233 toward the second orientation to cause the movable tray panel 224 to move toward the expanded position as shown in FIGS. 8 and 10.

Figure 8:
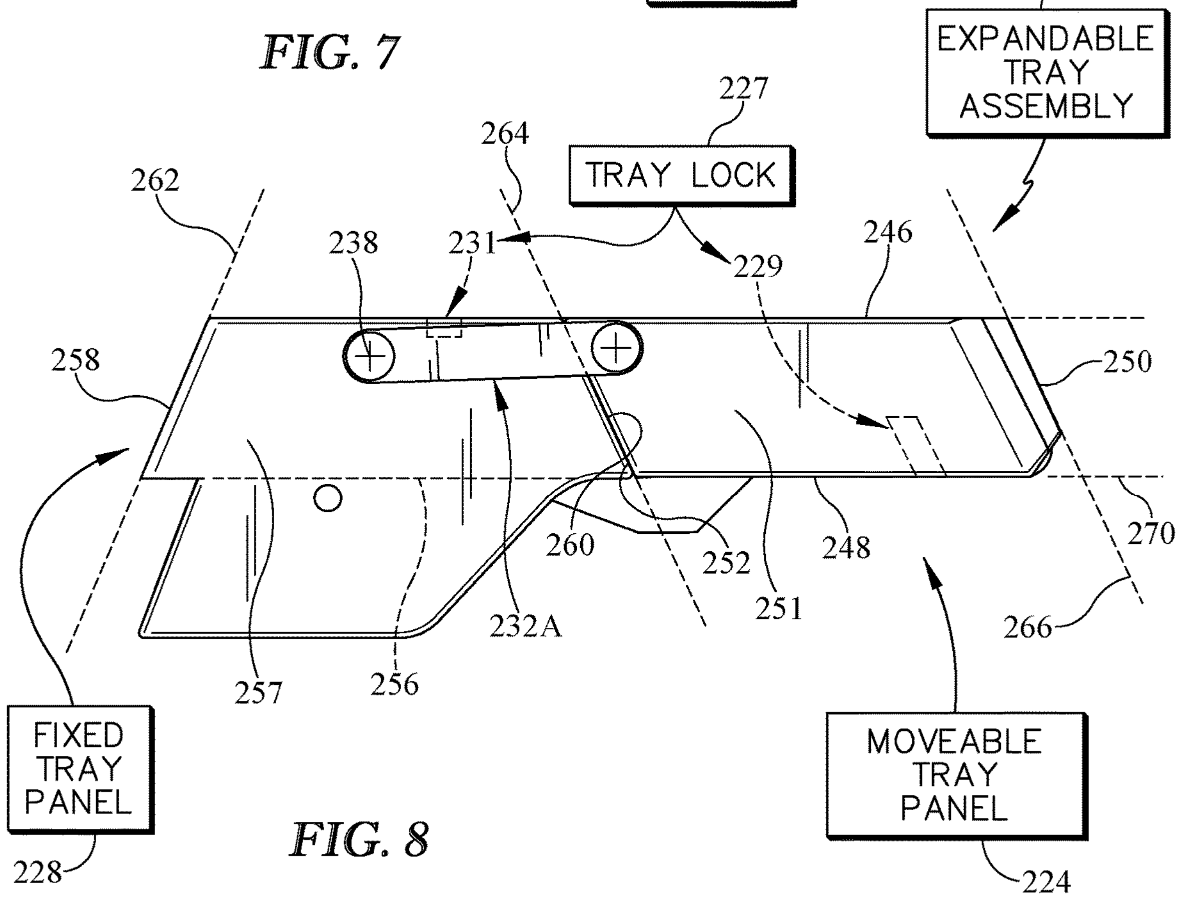
FIG. 8 is a side elevation view of the expandable tray assembly similar to that shown in FIG. 7, except that the movable tray panel has been moved from the collapsed position to the expanded position while still being positioned in the upwardly facing orientation with the movable tray panel adjacent to the fixed tray panel showing the tray lock has been disengaged.

To block the tray-motion controller linkage 230 from moving the movable tray panel 224 to the expanded position, the expandable tray assembly 214 further includes a tray lock 227 as shown in FIGS. 6-8. The tray lock 227 includes a movable-tray lock portion 229 coupled to the movable tray panel 224 and a fixed-tray lock portion 231 coupled to the fixed tray panel 228. The movable-tray lock portion 229 works with the fixed-tray lock portion 331 to block movement of the movable tray panel 224 relative to the fixed tray panel 228.

In the illustrative embodiment, one of the movable-tray lock portion 229 and the fixed-tray lock portion 231 is a magnet and the other comprises a metallic material, such as a screw. The movable-tray lock portion 229 and the fixed-tray lock portion 231 produce a magnetic force therebetween so as to draw the movable-tray lock portion 229 towards the fixed-tray lock portion 231. The magnetic force created by the movable-tray lock portion 229 and the fixed-tray lock portion 231 is greater than the bias force of the bias member 235.

To move the movable tray panel 224 to the expanded position, the user applies an opening force to the movable tray panel 224 to overcome the magnetic force. Once the user initially overcomes the magnetic force of the tray lock 227, the bias force applied by the bias member 235 is greater than the magnetic force. This causes bias member 235 to move the movable tray panel 224 from the collapsed position as shown in FIGS. 7 and 9 to the expanded position as shown in FIGS. 8 and 10.

After the user is done using the step stool 210, the user applies a closing force in the opposite direction of the opening force to overcome the bias force of the bias member 235. The closing force causes the movable tray panel 224 to move from the expanded position to the collapsed position. As the user moves the movable tray panel 224 closer to the fixed tray panel 228, the magnetic force between the movable-tray lock portion 229 and the fixed-tray lock portion 231 becomes greater than the bias force and locks the movable tray panel 224 in the collapsed configuration.

Turning again to the expandable tray assembly 214, the movable tray panel 224 includes the upwardly-facing top surface 246, a downwardly-facing underside surface 247 opposite the top surface 246, a bottom surface 248 opposite the top surface 246 and spaced apart from the underside surface 247, a rearwardly-facing surface 250, a forwardly-facing surface 252, and side surfaces 251, 253, as shown in FIGS. 6-10. The rearwardly-facing surface 250 that extends between the top surface 246 and the bottom surface 248. The forwardly-facing surface 252 is positioned opposite the rearwardly-facing surface 250 and extends between the top surface 246 and the bottom surface 248. Each of the side surface 251, 253 extends between the rearwardly-facing and forwardly-facing surfaces 250, 252.

The movable tray panel 224 rests on top of the fixed tray panel 228 in the upwardly-facing orientation when the expandable tray assembly 214 is in the collapsed configuration shown in FIG. 9. The movable tray panel 224 is supported adjacent to the fixed tray panel 228 in the upwardly-facing orientation when the expandable tray assembly 214 is in the expanded configuration shown in FIG. 11.

The fixed tray panel 228 includes an upwardly-facing top surface 254, a bottom surface 256 opposite the top surface 254, a forwardly-facing surface 258, a rearwardly-facing surface 260, and side surfaces 257, 259, as shown in FIGS. 6-10. The rearwardly-facing surface 260 extends between the top surface 254 and the bottom surface 256. The forwardly-facing surface 258 is positioned opposite the rearwardly-facing surface 260 and extends between the top surface 254 and the bottom surface 256. Each of the side surfaces 257, 259 extends between the forwardly-facing and rearwardly-facing surfaces 258, 260. The fixed tray panel 228 further provides a middle-link space 261 for receiving the middle link 233, as shown in FIG. 6.

When the expandable tray assembly 214 is in the collapsed configuration, as shown in FIG. 9, the bottom surface 248 of the movable tray panel 224 abuts and engages the top surface 254 of the fixed tray panel 228. The forwardly-facing surface 252 of the movable tray panel 224 and the rearwardly-facing surface 260 of the fixed tray panel 228 are parallel along an intermediate plane 264. The rearwardly-facing surface 250 of the movable tray panel 224 is parallel to the rearwardly-facing surface 260 of the fixed tray panel 228 along a rearward plane 266.

The intermediate plane 264 is parallel to the rearward plane 266 in the illustrative embodiment. The forwardly-facing surface 258 of the fixed tray panel 228 extends along a forward plane 262 that is offset from the intermediate plane 264 and the rearward plane 266.

Each of the side links 232A, 232B are coupled to the side surfaces 251, 253, 257, 259 of the panels 224, 228 with fasteners 237A, 237B. The first side link 232A is coupled to the first side surface 251 of the movable tray panel 224 and to the first side surface 257 of the fixed tray panel 228 with the fasteners 237A. The second side link 232B is coupled to the second side surface 253 of the movable tray panel 224 and to the second side surface 259 of the fixed tray panel 228 with the fasteners 237B.

The middle link 233 is coupled to the fixed tray panel 228 in the middle-link space 261 and to the movable tray panel 224 below the underside surface 247 with fasteners 239A, 239B. The fasteners 239A extend through the panels 224, 228 into the middle link 233 on a first side of the middle link 233, while the fasteners 239B extend through the panels 224, 228 into the middle link 233 on a second side of the middle link 233 opposite the first side. In the illustrative embodiment, one of the fasteners 239A couples the bias member 235A to the middle link 233 on the first side of the middle link 233. One of the fasteners 239B couples the bias member 235B to the second side of the middle link 233.

The middle link 233 includes first portion 233A and a second portion 233B extending from the first portion 233A, as shown in FIGS. 9 and 10. The first portion 233A is coupled to the fixed tray panel 228, while the second portion 233B is coupled to the movable tray panel 224.

The second portion 233B of the middle link 233 rests on the underside surface 247 of the movable tray panel 224 in the first orientation when the expandable tray assembly 214 is in the collapsed configuration shown in FIG. 9. As the expandable tray assembly 214 is moved from the collapsed configuration to the expanded configuration, the first portion 233A of the middle link 233 rotates about the second-fixed-tray-panel axis 243 and the second portion 233B of the middle link 233 rotates about the second-movable-tray-panel axis 245.

The first portion 233A of the middle link 233 has a tray surface 282 that is parallel with the upwardly-facing top surfaces 246, 254 of the panels 224, 228 in the second orientation when the expandable tray assembly 214 is in the expanded configuration shown in FIG. 10. The second portion 233B helps support the movable tray panel 224 relative to the fixed tray panel 228 when the when the expandable tray assembly 214 is in the expanded configuration.

In the illustrative embodiment, the first portion 233A of the middle link 233 includes the tray surface 282, a bottom surface 283 opposite the tray surface 282, a forward surface 284, and a rearward surface 285, as shown in FIGS. 9 and 10. The forward and rearward surfaces 284, 285 extend between the tray surface 282 and the bottom surface 283.

In the illustrative embodiment, the second portion 233B of the middle link 233 includes a forward surface 286, a rearward surface 287 opposite the forward surface 286, and a terminal end 288, as shown in FIGS. 9 and 10. The forward surface 286 extends from the rearward surface 285 of the first portion 233A and the rearward surface 287 extends from the bottom surface 283 of the first portion 233A. The terminal end 288 extends between the forward and rearward surfaces 286, 287 of the second portion 233B.

When the expandable tray assembly 214 is in the collapsed configuration, as shown in FIG. 9, the middle link 233 is in the first orientation. In the first orientation, the rearward surface 287 of the second portion 233B engages the underside surface 247 of the movable tray panel 224 and the bottom surface 283 of the first portion 233A is parallel to the intermediate plane 264.

When the expandable tray assembly 214 is in the expanded configuration, as shown in FIG. 10, the middle link 233 is in the second orientation. In the second orientation, the rearward surface 285 of the first portion 233A engages the forwardly-facing surface 252 of the movable tray panel 224 and the tray surface 282 of the first portion 233A is parallel with the upwardly-facing top surfaces 246, 254 of the panels 224, 228. In the illustrative embodiment, the tray surface 282 is flush with surfaces 291S, 292S of the panels 224, 228 that form a compartment 290.

The compartment 290 is defined by a recess 291 defined by the movable tray panel 224 and a recess 292 defined by the fixed tray panel 228 as shown in FIGS. 5 and 6. The recesses 291, 292 cooperate when the movable tray panel 224 is in the expanded use position to provide the compartment 290 surrounded on all sides by walls to retain items stored/placed therein. The recesses 291, 292 are defined by surfaces 291S, 292S of the corresponding panel 224, 228 as shown in FIGS. 9-11.

In the illustrative embodiment, the movable tray panel 224 further includes recesses 295, 296 as shown in FIG. 6. The recesses 295, 296 form smaller compartments within the compartment 290. The fixed tray panel 228 further includes compartments 293, 294 as shown in FIG. 6.

As discussed above, the tray-motion controller linkage 230 is configured to control movement of the movable tray panel 224 as the expandable tray assembly 214 moves between the collapsed position shown in FIGS. 7 and 9 and the expanded position shown in FIGS. 8 and 10. As the expandable tray assembly 214 moves between the collapsed configuration and the expanded configuration, the movable tray panel 224 remains in the upwardly facing orientation, as suggested by FIGS. 7-10. As the expandable tray assembly 214 moves between the collapsed configuration and the expanded configuration, the movable tray panel 224 remains in the upwardly facing orientation, as suggested by FIGS. 7-10, but the middle link 233 changes from the first orientation to the second orientation, as suggested in FIGS. 9 and 10.

When the expandable tray assembly 214 is in the expanded configuration, the movable tray panel 224 is adjacent to the fixed tray panel 228, as shown in FIGS. 7 and 9. When the expandable tray assembly 214 is in the expanded configuration, the top surface 246 of the movable tray panel 224 is aligned with the top surface 254 of the fixed tray panel 228 along an intermediate-transverse plane 268, and the bottom surface 248 of the movable tray panel 224 is aligned with the bottom surface 256 of the fixed tray panel 228 along a bottom-transverse plane 270 parallel to the intermediate-transverse plane 268. Further, when the expandable tray assembly 214 is in the expanded configuration, the recess surface 291S of the movable tray panel 224 is aligned with the recess surface 292S of the fixed tray panel 228 along an intermediate-transverse recess plane 268A.

When the expandable tray assembly 214 is in the expanded configuration, the forwardly-facing surface 258 of the fixed tray panel 228 is positioned along the forward plane 262 and the rearwardly-facing surface 250 of the movable tray panel 224 is positioned along the rearward plane 266 parallel to the intermediate plane 264. Simultaneously, the rearwardly-facing surface 260 of the fixed tray panel 228, the forwardly-facing surface 252 of the movable tray panel 224, and the rearward surface 285 of the middle link 233 are positioned along the intermediate plane 264, as shown in FIGS. 8 and 10.

The rearwardly-facing surface 260 of the fixed tray panel 228 and the rearward surface 285 of the middle link 233 are positioned in confronting, abutting relationship with the forwardly-facing surface 252 of the movable tray panel 224 to allow the fixed tray panel 228 to support the movable tray panel 224 when the expandable tray assembly 214 is in the expanded configuration. The second portion 233B of the middle link 233 also provides support to the underside of the movable tray panel 224 to help support the movable tray panel 224 when the expandable tray assembly 214 is in the expanded configuration.

The invention claimed is:

1. A step stool comprising a step stool frame including a front leg unit having at least one step supported above ground underlying the step stool and a rear leg unit coupled to the front leg unit to pivot from a closed storage position to an opened use position, and an expandable tray assembly coupled to the step stool frame, the expandable tray assembly including a fixed tray panel secured to the step stool frame, a movable tray panel mounted for movement relative to the fixed tray panel from a collapsed position arranged above the fixed tray panel to an expanded position arranged adjacent to the fixed tray panel, and tray-motion control means for guiding movement of the movable tray panel from the collapsed position to the expanded position such that during motion a top surface of the movable tray panel is maintained in an upwardly-facing orientation so that objects supported on the movable tray panel can remain in place during transition from the collapsed position to the expanded position, wherein the tray-motion control means includes a tray-motion controller linkage having a middle link, the middle link pivotably coupled to both the fixed tray panel and the movable tray panel, the middle link arranged between and spaced apart from each of the left and right side surfaces of the fixed tray panel and of the movable tray panel.

2. The step stool of claim 1, wherein the tray-motion controller linkage further includes (i) a first link mounted for rotation about a first-fixed-tray-panel axis and pivotably coupled to the movable tray panel for rotation about a first-movable-tray-panel axis and (ii) a second link mounted for rotation about the first-fixed-tray-panel axis and pivotably coupled to the movable tray panel for rotation about the first-movable-tray-panel axis.

3. The step stool of claim 2, wherein the tray-motion control means further includes a bias member extending between the fixed tray panel and the middle link, and the bias member configured to provide a bias force to the middle link to cause the middle link to move the movable tray panel toward the expanded position.

4. The step stool of claim 3, wherein the expandable tray assembly further includes a tray lock configured to block the movable tray panel from moving to the expanded position, the tray lock having a movable-tray lock portion coupled to the movable tray panel and a fixed-tray lock portion coupled to the fixed tray panel configured to engage the movable-tray lock portion to block movement of the movable tray panel relative to the fixed tray panel.

5. The step stool of claim 4, wherein the movable-tray lock portion and the fixed-tray lock portion produce a magnetic force therebetween so as to draw the movable-tray lock portion towards the fixed-tray lock portion; and, wherein the magnetic force created by the movable-tray lock portion and the fixed-tray lock portion is greater than the bias force of the bias member.

6. The step stool of claim 2, wherein the movable tray panel rests on top of the fixed tray panel in the upwardly-facing orientation when the movable tray panel is in the collapsed position; and, wherein the movable tray panel is adjacent to and engaged with the fixed tray panel in the upwardly-facing orientation when the movable tray panel is in the expanded position.

7. The step stool of claim 2, wherein the expandable tray assembly includes a fixed tray mount integrally formed with the fixed tray panel and coupled to the step stool frame to fix the fixed tray panel in place relative to at least a portion of the step stool frame.

8. The step stool of claim 2, wherein the movable tray panel is shaped to define a first recess, the fixed tray panel is formed to define a second recess, and the first and second recesses cooperate when the movable tray panel is in the expanded position to provide a compartment surrounded on all sides by walls to retain items placed therein.

9. The step stool of claim 8, wherein the middle link includes a tray surface that is flush with upwardly facing surfaces of the fixed tray panel and the movable tray panel when the movable tray panel is in the expanded position, and wherein the tray surface of the middle link faces the compartment.

10. The step stool of claim 2, wherein the middle link is pivotably coupled to the fixed tray panel about a second-fixed-tray-panel axis and pivotably coupled to the movable tray panel for rotation about a second-movable-tray-panel axis.

11. The step stool of claim 10, wherein the middle link includes a first portion coupled to the fixed tray panel and a second portion coupled to the movable tray panel, the second portion being configured to rest on an underside surface of the movable tray panel when the movable tray panel is in the collapsed position and the first portion being configured to engage a forwardly-facing surface of the movable tray panel when the movable tray panel is in the expanded position.

12. The step stool of claim 3, wherein the bias member is configured to bias the middle link from a first orientation in which the movable tray panel is in the collapsed position to a second orientation in which the movable tray panel is in the expanded position; and wherein an end of the bias member is configured to extend into a notch formed in the middle link to engage the middle link and to bias the middle link toward the second orientation to cause the movable tray panel to move toward the expanded position, wherein the middle link is pivotably coupled to the fixed tray panel about a second-fixed-tray-panel axis and pivotably coupled to the movable tray panel for rotation about a second-movable-tray-panel axis.

13. A step stool comprising a step stool frame including having at least one step supported above ground underlying the step stool, and an expandable tray assembly coupled to the step stool frame, the expandable tray assembly including a fixed tray panel secured to the step stool frame, a movable tray panel mounted for movement relative to the fixed tray panel from a collapsed position arranged above the fixed tray panel to an expanded position arranged adjacent to the fixed tray panel, and tray-motion controller linkage configured to guide the movement of the movable tray panel from the collapsed position to the expanded position such that during motion a top surface of the movable tray panel is maintained in an upwardly-facing orientation, wherein the tray-motion controller linkage includes (i) a first link mounted for rotation about a first-fixed-tray-panel axis and pivotably coupled to the movable tray panel for rotation about a first-movable-tray-panel axis and (ii) a second link mounted for rotation about the first-fixed-tray-panel axis and pivotably coupled to the movable tray panel for rotation about the first-movable-tray-panel axis, and (iii) a middle link pivotably coupled to both the fixed tray panel and the movable tray panel, the middle link arranged between left and right side surfaces of the fixed tray panel and of the movable tray panel.

14. The step stool of claim 13, further comprising at least one bias member configured to move the movable tray panel toward the expanded position.

15. The step stool of claim 14, wherein the expandable tray assembly further includes a tray lock configured to selectively block the movable tray panel from moving to the expanded position.

16. The step stool of claim 13, wherein the movable tray panel rests on top of the fixed tray panel in the upwardly-facing orientation when the movable tray panel is in the collapsed position; and, wherein the movable tray panel is adjacent to and engaged with the fixed tray panel in the upwardly-facing orientation when the movable tray panel is in the expanded position.

17. The step stool of claim 13, wherein the middle link is pivotably coupled to the fixed tray panel about a second-fixed-tray-panel axis and pivotably coupled to the movable tray panel for rotation about a second-movable-tray-panel axis.

18. The step stool of claim 14, wherein the bias member is configured to extend into a notch formed in the middle link to engage the middle link and to bias the middle link from a first orientation in which the movable tray panel is in the collapsed position to a second orientation in which the movable tray panel is in the expanded position.

19. The step stool of claim 13, wherein the first link is coupled to the left side surfaces of the fixed tray panel and the movable tray panel and the second link is coupled to the right side surfaces of the fixed tray panel and the movable tray panel.

20. The step stool of claim 14, wherein the at least one bias member includes a first bias member arranged on a first side of the middle link and a second bias member arranged on a second, opposite side of the middle link.

* * * * *